(12) United States Patent
Ishihara

(10) Patent No.: US 6,707,547 B2
(45) Date of Patent: Mar. 16, 2004

(54) METHOD AND APPARATUS FOR ANALYZING WAVELENGTH-DIVISION MULTIPLEXED SIGNAL LIGHT

(75) Inventor: Gentaro Ishihara, Tokyo (JP)

(73) Assignee: Ando Electric Co., Ltd., Tokyo (JP)

( * ) Notice: Subject to any disclaimer, the term of this patent is extended or adjusted under 35 U.S.C. 154(b) by 154 days.

(21) Appl. No.: 09/850,860

(22) Filed: May 8, 2001

(65) Prior Publication Data

US 2002/0005948 A1 Jan. 17, 2002

(30) Foreign Application Priority Data

Jun. 29, 2000 (JP) ..................................... P.2000-196066

(51) Int. Cl.[7] .............................. G01J 3/00; H04J 14/02
(52) U.S. Cl. ......................................... 356/300; 398/79
(58) Field of Search ........................ 356/73.1, 300–334; 250/227.23, 227.11; 359/341.1, 333, 115, 114, 110; 398/79, 141, 9

(56) References Cited

U.S. PATENT DOCUMENTS

| | | | | |
|---|---|---|---|---|
| 5,361,154 A | * | 11/1994 | Nakata ........................ | 398/75 |
| 5,420,416 A | * | 5/1995 | Iida et al. ................. | 250/201.1 |
| 5,617,234 A | * | 4/1997 | Koga et al. ................. | 359/131 |
| 5,969,834 A | * | 10/1999 | Farber et al. ................ | 359/110 |
| 6,055,078 A | * | 4/2000 | Chen et al. .................... | 398/79 |
| 6,344,910 B1 | * | 2/2002 | Cao ............................ | 359/110 |
| 6,369,923 B1 | * | 4/2002 | Kuo et al. ..................... | 398/91 |
| 6,403,949 B1 | * | 6/2002 | Davis et al. ........... | 250/227.27 |
| 6,434,175 B1 | * | 8/2002 | Zah .............................. | 372/20 |
| 6,441,933 B1 | * | 8/2002 | Jang ........................... | 398/79 |
| 6,476,953 B1 | * | 11/2002 | Morkel ...................... | 398/175 |

* cited by examiner

Primary Examiner—Zandra V. Smith
Assistant Examiner—Gordan J. Stock
(74) Attorney, Agent, or Firm—Fish & Richardson P.C.

(57) ABSTRACT

In a method of analyzing wavelength-division multiplexed signal light, a plurality of reference wavelengths ($\lambda C1$-$\lambda Cm$) as preliminary specified by the ITU-T standards are stored in a memory; then, maximum points of light intensity are determined from waveform data obtained by measuring an actual wavelength-division multiplexed optical spectrum; any one of the maximum points which at least differs in light intensity from the two minimum points, one being right to said maximum point and the other being left, by at least a channel identifying threshold (TH) level is identified as a channel, and the wavelength of the identified channel is determined as $\lambda Dn$; then, the $\lambda Dn$ for each channel is rounded to the value of the nearest ITU-T grid wavelength $\lambda Cm$ so as to determine the reference wavelength $\lambda An$ for each channel and the determined reference wavelengths $\lambda An$ are stored in the memory.

16 Claims, 9 Drawing Sheets

FIG. 10

| ELEMENT NUMBER m | ITU-T REFERENCE WAVELENGTHS $\lambda_{Cm}$ |
|---|---|
| 1 | 1529.163 nm |
| 2 | 1529.944 nm |
| 3 | 1530.725 nm |
| ⋮ | ⋮ |
| 23 | 1546.518 nm |
| 24 | 1547.316 nm |
| 25 | 1548.115 nm |
| 26 | 1548.915 nm |
| 27 | 1549.715 nm |
| 28 | 1550.517 nm |
| 29 | 1551.319 nm |
| 30 | 1552.122 nm |
| 31 | 1552.926 nm |
| 32 | 1553.731 nm |
| 33 | 1554.537 nm |
| 34 | 1555.343 nm |
| 35 | 1556.151 nm |
| 36 | 1556.959 nm |
| 37 | 1557.768 nm |
| 38 | 1558.578 nm |
| 39 | 1559.389 nm |
| 40 | 1560.200 nm |

FIG. 11

| CHANNEL NUMBER n | WAVELENGTH OF THE MAXIMUM POINT IDENTIFIED AS CHANNEL $\lambda Dn$ | WAVELENGTH OBTAINED BY ROUNDING $\lambda Dn$ TO THE NEAREST $\lambda Cm$ $\lambda An$ | CENTRAL WAVELENGTH OF EACH CHANNEL $\lambda Bn$ | WAVELENGTH ERROR $\Delta\lambda n$ |
|---|---|---|---|---|
| 1 | 1547.460 nm | 1547.316 nm | 1547.464 nm | -0.148 nm |
| 2 | 1549.060 nm | 1548.915 nm | 1549.076 nm | -0.161 nm |
| 3 | 1550.680 nm | 1550.517 nm | 1550.679 nm | -0.162 nm |
| 4 | 1552.260 nm | 1552.122 nm | 1552.268 nm | -0.145 nm |
| 5 | 1553.880 nm | 1553.731 nm | 1553.885 nm | -0.154 nm |
| 6 | 1555.520 nm | 1555.343 nm | 1555.510 nm | -0.166 nm |
| 7 | 1557.120 nm | 1556.959 nm | 1557.126 nm | -0.167 nm |
| 8 | 1558.740 nm | 1558.578 nm | 1558.747 nm | -0.169 nm |

METHOD AND APPARATUS FOR ANALYZING WAVELENGTH-DIVISION MULTIPLEXED SIGNAL LIGHT

BACKGROUND OF THE INVENTION

1. Field of the Invention

The present invention relates to a method of analyzing wavelength-division multiplexed signal light. More particularly, it relates to a method and an apparatus for analyzing wavelength-division multiplexed signal light which feature the capability of determining reference wavelengths automatically.

2. Description of the Related Art

In optical communications where information signals are carried on intensity-modulated light, the use of wavelength-division multiplexing (WDM) is rapidly increasing today. In WDM, light output from n light sources of different wavelengths (hence, frequencies) is multiplexed so that optical signals having different wavelengths (hence, frequencies) are treated as separate channels.

FIG. 1 shows an exemplary optical spectrum of wavelength-division multiplexed signal light. The wavelength (hence, frequency) of each channel of this light is customarily of any value that is selected from among reference wavelengths $\lambda C1, \lambda C2, \ldots \lambda Cm$ spaced at equal intervals as specified by the ITU-T (International Telecommunication Union-Telecommunication sector) standards. In FIG. 1, $\lambda An$ is the reference wavelength of channel n as selected from among those standard reference wavelengths. The optical intensities of the respective channels are represented by $P1, P2, \ldots Pn$ and it is usually considered ideal that they have no variations but are constant.

FIG. 2 shows an exemplary optical spectrum of actual wavelength-division multiplexed signal light having n channels. In the optical spectrum shown in FIG. 2, the central wavelength $\lambda Bn$ of each channel contains an error $\Delta\lambda n$ with respect to the reference wavelength $\lambda An$ specified by the ITU-T standards and the optical intensity Pn of each channel also contains an error $\Delta Pn$. In optical communications using wavelength-division multiplexed signal light, interference will occur if the errors $\Delta\lambda n$ and $\Delta Pn$ are significant in each channel.

Therefore, in the actual use of wavelength-division multiplexed signal light in optical communications, the errors $\Delta\lambda n$ and $\Delta Pn$ in the optical spectrum of the light are usually subjected to preliminary analysis, typically using an optical spectrum analyzer that measures intensity vs. wavelength characteristics by means of a spectrometer having in its interior a diffraction grating or some other device to separate the incident light into its spectral components.

FIG. 3 illustrates how the spectrum waveform of a single channel n in the wavelength-division multiplexed signal light is analyzed. To analyze the central wavelength $\lambda Bn$ and the peak power Pn, the spectrum waveform's peak level Pn is determined within the range of $\pm\Delta\lambda_R$ from the reference wavelength $\lambda An$ of the channel of interest; then, a line indicating Pn minus a threshold level TH (=Pn–TH) is drawn parallel to the horizontal axis of the graph in FIG. 3; since the line for Pn–TH crosses the spectrum waveform at two points, the wavelength of the midpoint between the two crossing points is determined as the central wavelength $\lambda Bn$ of the channel of interest; the difference between the reference wavelength $\lambda An$ and the central wavelength $\lambda Bn$ is taken to determine the wavelength error $\Delta\lambda n$.

In order to analyze optical spectra by the above-described method, the reference wavelength $\lambda An$ must preliminarily be known for each channel and the value of $\lambda An$ for each channel must be registered in a memory before analysis starts.

FIG. 4 shows an exemplary optical spectrum of 4-channel wavelength-division multiplexed signal light. In the illustrated case, four of the reference wavelengths $\lambda Cm$ as determined by the ITU-T standards are allotted as the reference wavelengths $\lambda An$ of the four channels and they are $\lambda C1, \lambda C3, \lambda C5$ and $\lambda C7$ corresponding to $\lambda A1, \lambda A2, \lambda A3$ and $\lambda A4$, respectively, which must be registered in the memory before actual analysis of the spectrum starts.

FIG. 5 shows another exemplary optical spectrum of 4-channel wavelength-division multiplexed signal light. In the illustrated case, four of the reference wavelengths $\lambda Cm$ as determined by the ITU-T standards are allotted as the reference wavelengths $\lambda An$ of the four channels and they are $\lambda C1, \lambda C2, \lambda C5$ and $\lambda C6$ corresponding to $\lambda A1, \lambda A2, \lambda A3$ and $\lambda A4$, respectively, which must be registered in the memory before actual analysis of the spectrum starts.

Thus, prior to analyzing optical spectra, the reference wavelength $\lambda An$ of each channel in the spectrum to be analyzed need be set in accordance with the channel wavelength $\lambda Cm$ of the spectrum.

There may be a case where analysis of an optical spectrum comprising one combination of channels, say, the spectrum shown in FIG. 4, is followed by analysis of another optical spectrum comprising a different combination of channels, say, the spectrum shown in FIG. 5. In a case like this, the reference channel $\lambda An$ of each channel must be reset in accordance with the channel wavelengths $\lambda Cm$ of the spectrum under analysis.

The above-described prior art method may be used to analyze n-channeled wavelength-division multiplexed signal light in accordance with the flowsheet shown in FIG. 6.

First, reference wavelengths $\lambda A1, \lambda A2, \ldots \lambda An$ corresponding to the respective channels of the wavelength-division multiplexed signal light to be analyzed are input and stored in a memory (step A1).

Then, the optical spectrum of the wavelength-division multiplexed signal light is measured with an optical spectrum analyzer or any other suitable apparatus and the measured spectrum waveform data is stored in the memory (step A2).

Then, on the basis of the measured waveform data, the spectrum waveform's peak level Pn is determined within the range of $\pm\Delta\lambda_R$ from the reference wavelength $\lambda An$ of each channel; a line indicating Pn minus a threshold level TH (=Pn–TH) is drawn parallel to the horizontal axis of the spectrum graph; since the line for Pn–TH crosses the spectrum waveform at two points, the wavelength of the midpoint between the two crossing points is determined as the central wavelength $\lambda Bn$ of each channel (step A3).

Subsequently, the difference between the reference wavelength $\lambda An$ and the central wavelength $\lambda Bn$ is taken to determine the wavelength error $\Delta\lambda n$ (step A4).

Then, the central wavelength $\lambda Bn$ and the wavelength error $\Delta\lambda n$ are output to a display or some other device as the results of analysis (step A5).

If the analysis is not to be repeated, the process ends but if the user wants another analysis, the process continues (step A6).

If the wavelength-division multiplexed signal light to be analyzed varies in channel wavelength $\lambda An$, the sequence returns to the step of inputting another set of reference wavelengths λA1, λA2, . . . λAn corresponding to the respective channels of the wavelength-division multiplexed signal light (step A1); if there is no such change, the sequence returns to step A2.

As will be understood from the foregoing description, the prior art method of analyzing wavelength-division multiplexed signal light has the disadvantage of time-consuming input step since the reference wavelengths λAn corresponding to the respective channels must be input one by one before analysis starts.

The same disadvantage occurs if the combination of channels in the optical spectrum to be analyzed is different from the previous one and this is because the reference wavelengths λAn that correspond to the respective channels in the optical spectrum under current analysis have to be reset one by one.

SUMMARY OF THE INVENTION

An object of the present invention is to ensure that the data about the reference wavelengths λAn which are necessary to analyze the optical spectrum of wavelength-division multiplexed signal light are determined automatically from the spectrum waveform data for the optical spectrum of actual wavelength-division multiplexed signal light and stored in a memory, thereby eliminating the need to input the reference wavelengths λAn one by one even in the case where the combination of channels in the optical spectrum to be analyzed is different from the previous one.

To attain this object, the apparatus of the invention for analyzing wavelength-division multiplexed signal light performs the following steps in sequence:

storing a plurality of reference wavelengths (λC1-λCm) in a memory as preliminary specified by the ITU-T standards;

determining maximum points of light intensity from spectrum waveform data obtained by measuring an actual wavelength-division multiplexed optical spectrum, identifying as a channel any one of the maximum points which at least differs in light intensity from the two minimum points, one being right to said maximum point and the other being left, by at least a channel identifying threshold (TH) level, and determining the wavelength of the identified channel as λDn;

then rounding the λDn for each channel to the value of the nearest ITU-T grid wavelength λCm so as to determine the reference wavelength λAn for each channel and storing the determined reference wavelengths λAn in the memory.

As a result, the reference wavelengths λAn can be determined automatically from the actual optical spectrum of wavelength-division multiplexed signal light. This eliminates the need to input the reference wavelengths λAn one by one and even if the combination of channels in the optical spectrum to be analyzed is different from the previous one, the reference wavelengths λAn can be easily determined and stored in the memory.

The method of the invention for analyzing wavelength-division multiplexed signal light attains the above-mentioned object by adopting the design set forth in one of the following paragraphs 1–8:

1. Analyzing the wavelength (λDn) of each channel from input data for optical spectrum waveform, storing the analyzed wavelength (λDn) of each channel as the reference wavelength (λAn) of each channel, and analyzing the central wavelength (λBn) of each channel from the input data for optical spectrum waveform and the reference wavelength (λAn) of each channel.

2. Storing reference wavelengths (λCm) in a memory as preliminary specified by the ITU-T standards, analyzing the wavelength (λDn) of each channel from input data for optical spectrum waveform, rounding the analyzed wavelength (λDn) of each channel to the value of the nearest reference wavelength (λCm) so as to analyze the reference wavelength (λAn) of each channel, storing the analyzed reference wavelength (λAn) of each channel, and analyzing the central wavelength (λBn) of each channel from the input data for optical spectrum waveform and the reference wavelength (λAn) of each channel.

3. Storing a plurality of reference wavelengths (λC1- λCm) in a memory as preliminary specified by the ITU-T standards, determining maximum points of light intensity from spectrum waveform data obtained by measuring an actual wavelength-division multiplexed optical spectrum, identifying as a channel any one of the maximum points which at least differs in light intensity from the two minimum points, one being right to said maximum point and the other being left, by at least a channel identifying threshold (TH) level, determining the wavelength of the identified channel as λDn, then rounding the λDn for each channel to the value of the nearest ITU-T grid wavelength λCm so as to determine the reference wavelength λAn for each channel, storing the reference wavelengths λAn in the memory, thereby determining the reference wavelengths λAn automatically from the actual wavelength-division multiplexed signal light.

4. A first storage step for storing reference wavelengths (λCm) in a memory as specified by the ITU-T standards;

a second storage step for measuring the optical spectrum of the wavelength-division multiplexed signal light to be analyzed and storing the measured spectrum waveform data in the memory;

the step of determining the wavelength (λDn) at the maximum point of each channel from the waveform data;

a third storage step for rounding the wavelength (λDn) at said maximum point to the value of the nearest reference wavelength (λCm) and storing the rounded value in the memory as a reference wavelength (λAn);

a central wavelength analyzing step for determining the central wavelength (λBn) of each channel from the spectrum waveform data and said reference wavelength (λAn);

a first step for determining a wavelength error (Δλn) which is the difference between said central wavelength (λBn) and said reference wavelength (λAn); and an output step for outputting said central wavelength (λBn) and the wavelength error (Δλ) as the results of analysis.

5. Including an additional step between said step for determining the wavelength (λDn) at the maximum point of each channel from the waveform data and said third storage step, said additional step being for identifying as a channel any one of the maximum points which at least differs in light intensity from the two minimum points, one being right said maximum point and the other being left, by at least a channel identifying threshold (TH) level and determining the wavelength (λDn) of that maximum point.

6. Including a reference wavelength resetting step between said second storage step and said step of determining the wavelength (λDn) at the maximum point of each channel, said additional step being for determining if it is necessary to reset the values of the reference wavelengths (λAn) and allowing the sequence to proceed to said central wavelength analyzing step if no resetting of the reference wavelengths (λAn) is made in said reference wavelength resetting step.

7. If it has been decided in said reference wavelength resetting step to reset the values of the reference wavelengths (λAn), the sequence proceeds to the step of determining the wavelength (λDn) at the maximum point of each channel from the waveform data.

8. The output step for outputting the central wavelength (λBn) and the wavelength error (Δλ) as the results of analysis is followed by the step of determining as to whether a repeated measurement is to be made and if the answer is yes, the sequence returns to the second storage step for measuring the optical spectrum of the wavelength-division multiplexed signal light to be analyzed and storing the measured spectrum waveform data in the memory.

The apparatus of the invention for analyzing wavelength-division multiplexed signal light attains the above-mentioned object by adopting the design set forth in one of the following paragraphs 9 and 10:

9. Comprising:
   a first analysis means for analyzing the wavelength (λDn) of each channel from input data for optical spectrum waveform;
   a first storage means for storing the analyzed wavelength (λDn) of each channel as the reference wavelength (λAn) of each channel; and
   a second analysis means for analyzing the central wavelength (λBn) of each channel from the input data for optical spectrum waveform and the reference wavelength (λAn) of each channel.

10. Comprising:
    a second storage means for storing reference wavelengths (λCm) in a memory as preliminary specified by the ITU-T standards;
    a first analysis means for analyzing the wavelength (λDn) of each channel from input data for optical spectrum waveform;
    a third analysis means for rounding the analyzed wavelength (λDn) of each channel to the value of the nearest reference wavelength (λCm) so as to analyze the reference wavelength (λAn) of each channel;
    a third storage means for storing the analyzed reference wavelength (λAn) of each channel; and
    a second analysis means for analyzing the central wavelength (λBn) of each channel from the input data for optical spectrum waveform and the reference wavelength (λAn) of each channel.

BRIEF DESCRIPTION OF THE DRAWINGS

FIG. 10 is a table listing some of the reference wavelengths that are specified by the ITU-T standards and which are input for analysis in the preferred embodiment of the invention; and FIG. 11 is a table showing the results of analysis according to the preferred embodiment of the invention.

DETAILED DESCRIPTION OF THE PREFERRED EMBODIMENTS

Modes for performing the method of the present invention to analyze wavelength-division multiplexed signal light are described below with reference to the preferred embodiments shown in FIGS. 7 and 8.

Figure 1:
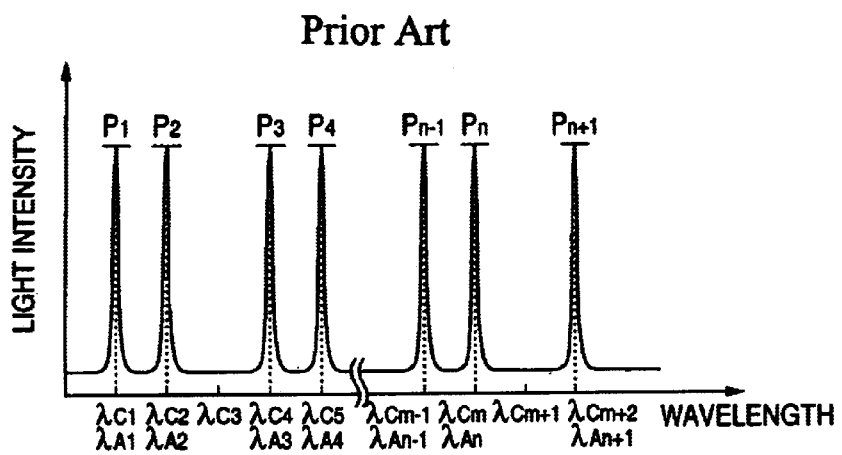
FIG. 1 shows an exemplary optical spectrum of wavelength-division multiplexed signal light output from n light sources of different wavelengths.
Figure 2:
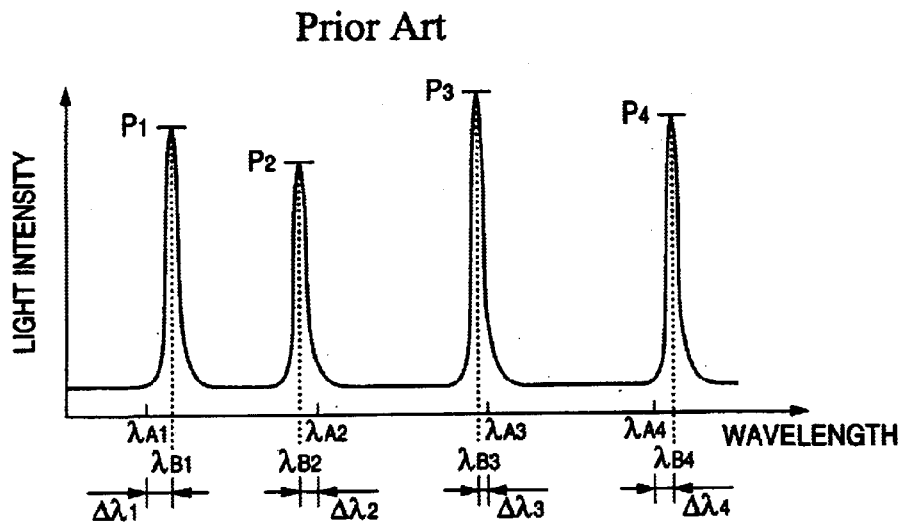
FIG. 2 shows an exemplary optical spectrum of actual wavelength-division multiplexed signal light having n channels.
Figure 3:
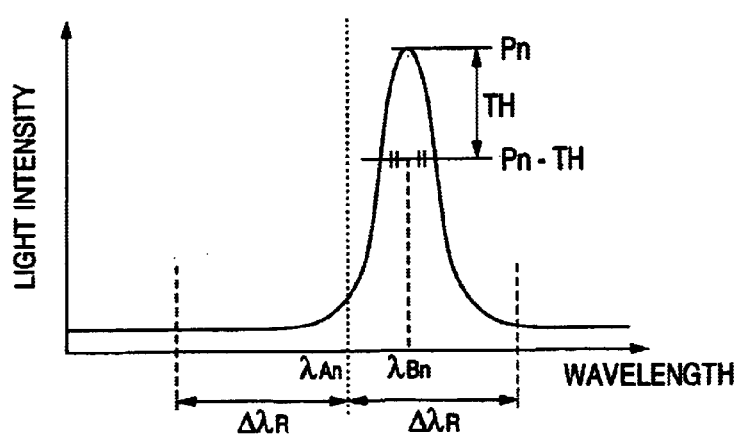
FIG. 3 illustrates how the spectrum waveform of a single channel n in the wavelength-division multiplexed signal light is analyzed.
Figure 4:
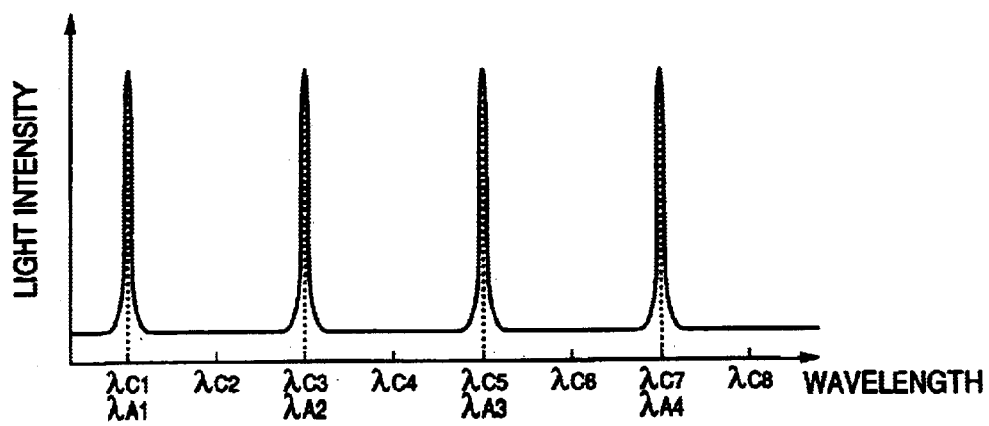
FIG. 4 shows an exemplary optical spectrum of 4-channel wavelength-division multiplexed signal light.
Figure 5:
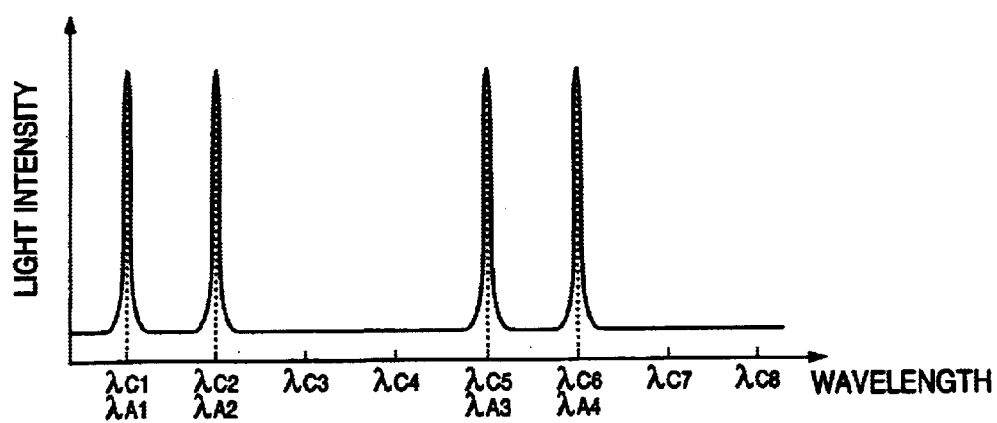
FIG. 5 shows another exemplary optical spectrum of 4-channel wavelength-division multiplexed signal light.
Figure 6:
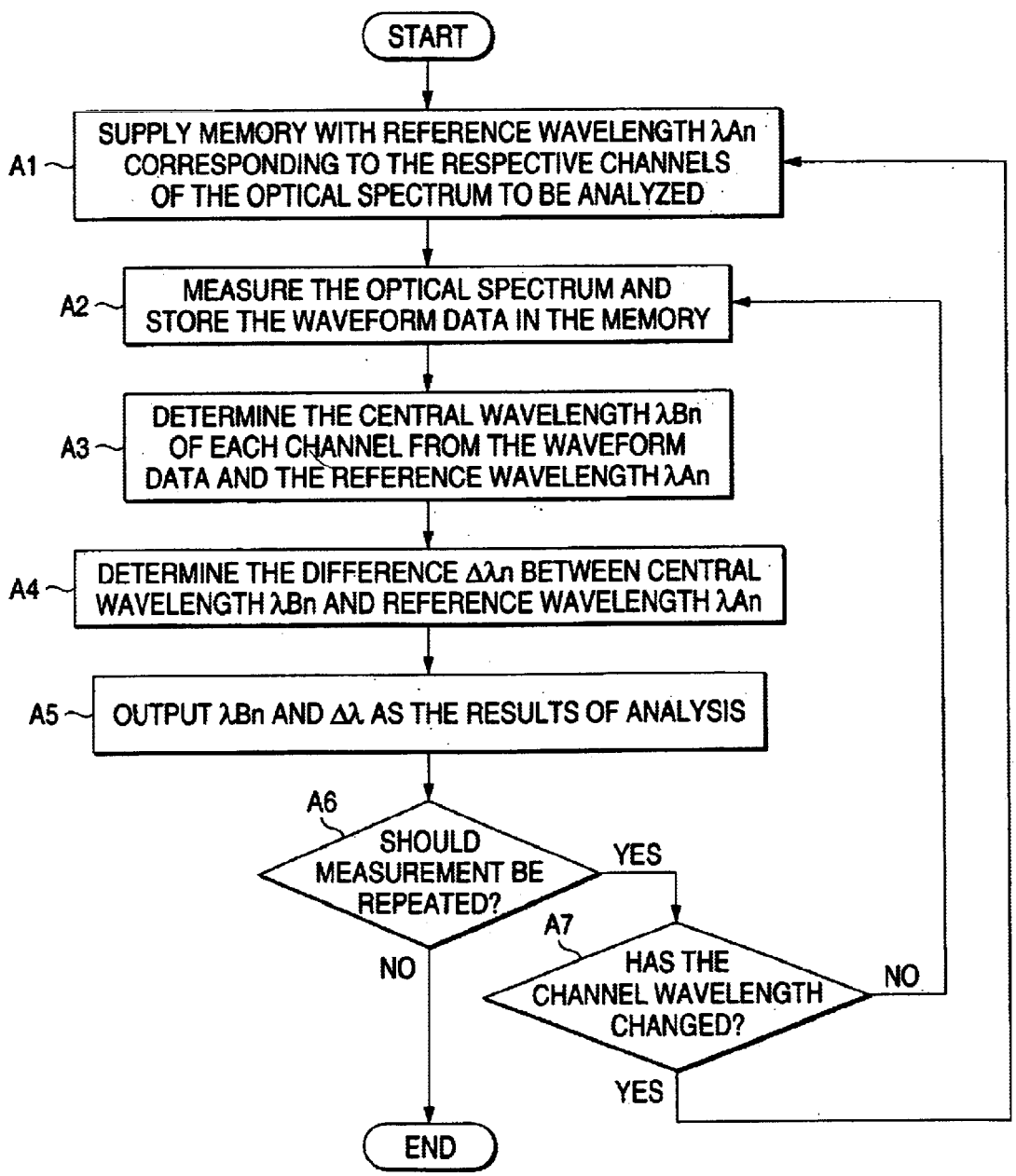
FIG. 6 is a flowchart for an exemplary procedure of analyzing n-channeled wavelength-division multiplexed signal light by the prior art.
Figure 7:
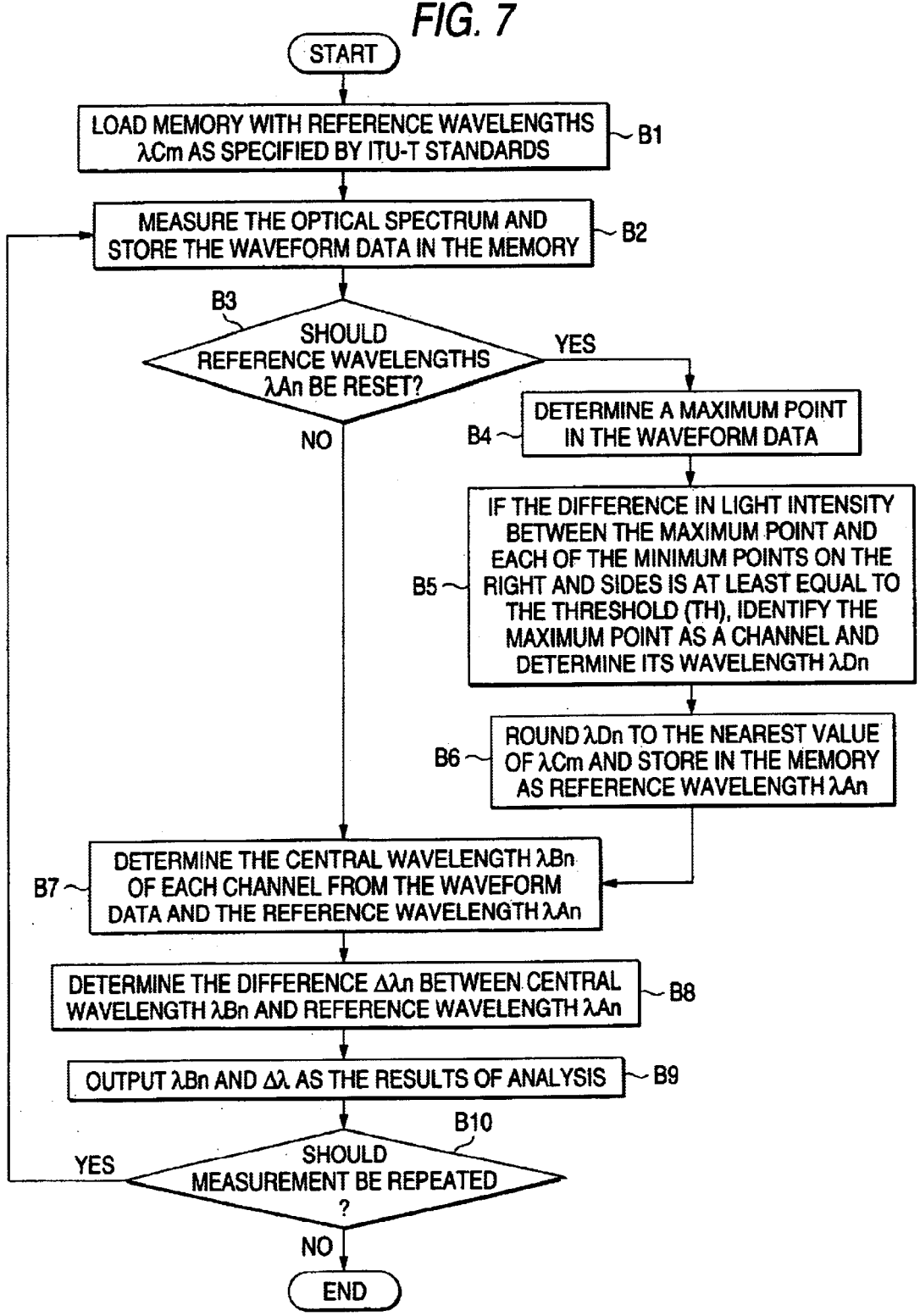
FIG. 7 is a flowchart for the sequence of steps in a preferred embodiment of the invention.

FIG. 7 is a flowchart for the sequence of steps in a preferred embodiment of the invention.

First, reference wavelengths λCm as specified by the ITU-T standards are preliminary stored in a memory (step B1). This step need be taken only once before analysis of wavelength-division signal light starts; there is no need to change the reference wavelengths λCm and the step need not be performed again as long as the reference wavelengths λCm are stored in the memory.

Then, the optical spectrum of the wavelength-division multiplexed signal light of interest is analyzed by a spectrum analyzer or some other suitable apparatus and the measured spectrum waveform data are stored in the memory (step B2).

Then, a question is asked if the reference wavelengths λAn corresponding to the respective channels in the wavelength-division multiplexed signal light have not been set or if there is the need to reset the values of reference wavelengths λAn as in the case of analyzing the optical spectrum of wavelength-division multiplexed signal light having a different combination of channels than in the previous analysis (step B3). If the answer is yes, the reference wavelengths λAn are reset (steps B4–B6) and thereafter the optical spectrum is analyzed (step B7 and the following).

If there is no need to reset the reference wavelengths λAn, analysis of the optical spectrum immediately follows (step B7 and the following).

If the reference wavelengths λAn need be reset, the point in the measured spectrum waveform data is first determined at which maximum light intensity occurs (step B4).

If the light intensity at the maximum point at least differs from either of the two minimum points, one being right to said maximum point and the other being left, by at least a channel identifying threshold (TH) level, said maximum point is identified as a channel and its wavelength λDn is determined (step B5).

Subsequently, the wavelength (λDn) of the maximum point identified as a channel is rounded to the value which is the nearest of the ITU-T reference wavelengths λCm stored in step B1 and the value of that nearest ITU-T reference wavelength λCm is stored as the reference wavelength λAn in the memory (step B6).

If the resetting of the reference wavelengths λAn ends or in the case where there was no need to make such resetting according to the decision in step B3, the spectrum waveform's peak level Pn is determined within the range of ±Δλ$_R$ from the reference wavelength λAn of each channel; a line indicating Pn minus a threshold level TH (=Pn−TH) is drawn parallel to the horizontal axis of the spectrum; since the line for Pn−TH crosses the spectrum waveform at two points, the wavelength of the midpoint between the two crossing points is determined as the central wavelength λBn of each channel (step B7).

Subsequently, the difference between the reference wavelength λAn and the central wavelength λBn is taken to determine the wavelength error Δλn (step B8).

Then, the central wavelength λBn and the wavelength error Δλn are output to a display or some other device as the results of analysis (step B9).

If the analysis is not to be repeated, the process ends but if the user wants another analysis, the sequence returns to step B2 (see step B10).

Figure 8:
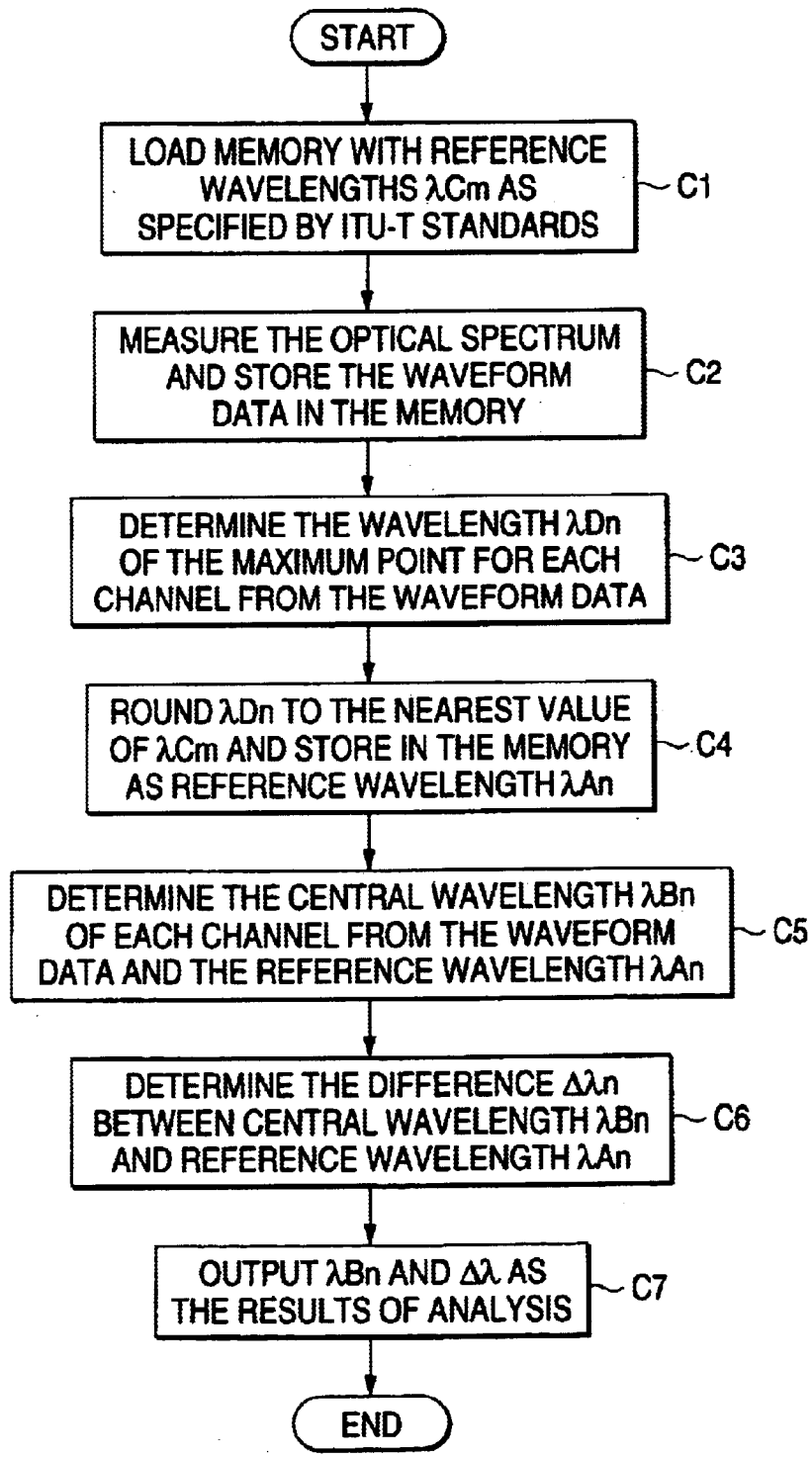
FIG. 8 is a flowchart for the case where the procedure outlined in FIG. 7 is implemented by an actual analyzer.

The above-described procedure may be implemented by an actual analyzer in accordance with the flowchart shown in FIG. 8. First, the values of λCm that have been specified by the ITU-T standards and which are typically shown in the table in FIG. 10 are stored in a memory (step C1).

Figure 9:
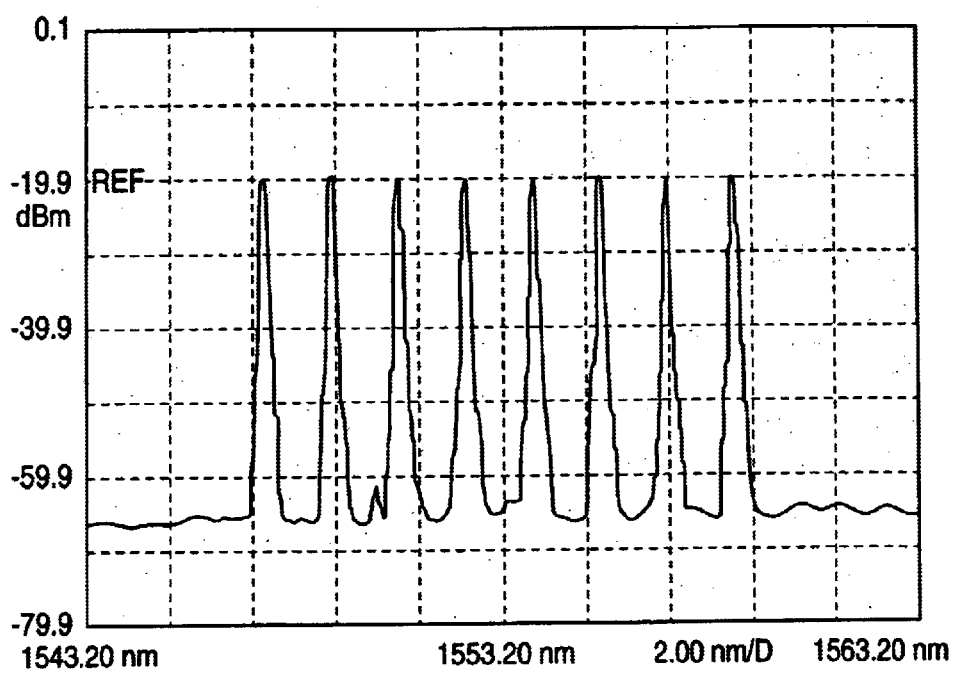
FIG. 9 shows an exemplary spectrum waveform of the optical spectrum obtained by analysis with a spectrum analyzer in the preferred embodiment of the invention.
Figure 12:
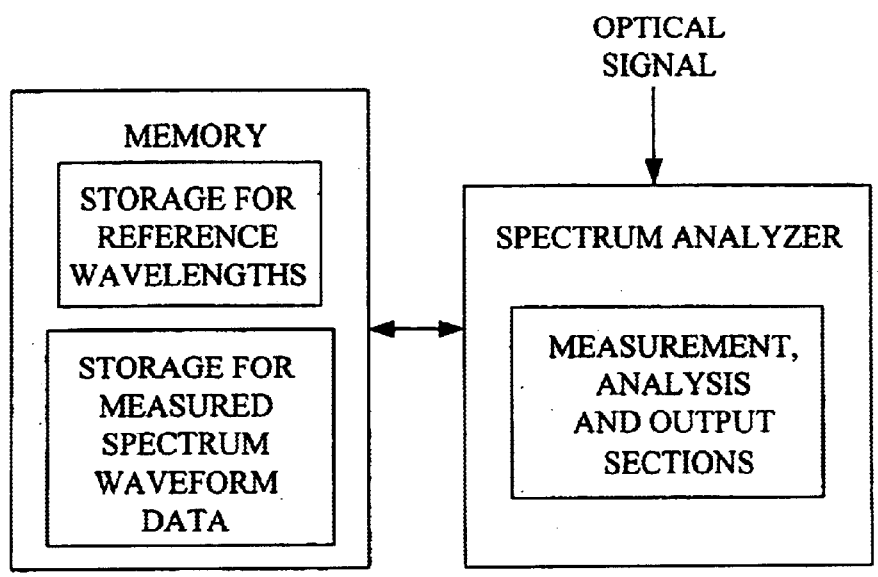
FIG. 12 is a block diagram of an apparatus according to the invention.

Then, the optical spectrum of the wavelength-division multiplexed signal light of interest is analyzed with a spectrum analyzer and the obtained spectrum waveform data is stored in the memory (step C2) An example of the obtained waveform data is shown in FIG. 9.

The procedure identified as steps B4 and B5 in FIG. 7 is applied to determine the wavelength (λDn) of the maximum point in the waveform data which is identified as a channel (step C3).

Then, the wavelength (λDn) of the maximum point is rounded to the value of the nearest reference wavelength λCm, determined as the reference wavelength λAn of each channel, and stored in the memory (step C4). Exemplary data for the thus determined wavelengths (λDn) of maximum points and the reference wavelengths λAn are tabulated in FIG. 11.

Then, using the waveform data and the values of reference wavelengths λAn, the method shown in step B7 in FIG. 7 is applied to determine the central wavelength λBn of each channel (step C5).

Subsequently, the difference between the central wavelength (λBn) of each channel and the reference wavelength λAn is determined as a wavelength error Δλn (step C6).

Exemplary data for the thus determined values of λBn and Δλn for each channel are tabulated in FIG. 11.

Then, the determined wavelength errors Δλn are output on screen as the results of analysis (step C7).

As will be understood from the foregoing description, in order to analyze wavelength-division multiplied signal light by the method of the present invention, reference wavelengths λAn corresponding to the respective channels need not be input one by one.

Using the method and apparatus of the invention, data about the reference wavelengths λAn which are necessary to analyze the optical spectrum of wavelength-division multiplexed signal light can be determined automatically from the spectrum waveform data for the optical spectrum of actual wavelength-division multiplexed signal light and this eliminates the need to input the reference wavelengths λAn one by one even in the case where the combination of channels in the optical spectrum to be analyzed is different from the previous one.

What is claimed is:

1. A method for analyzing wavelength-division multiplexed signal light, comprising the steps of:

storing reference wavelengths (λCm) in a memory as preliminary specified by ITU-T standards;

analyzing a wavelength (λDn) of each channel from input data for optical spectrum waveform;

rounding the analyzed wavelength (λDn) of each channel to a value of a nearest reference wavelength (λCm) to be used as the reference wavelength (λAn) of each channel;

storing the analyzed reference wavelength (λAn) of each channel; and analyzing the central wavelength (λBn) of each channel from the input data for optical spectrum waveform and the reference wavelength (λAn) of each channel.

2. A method for analyzing wavelength-division multiplexed signal light, comprising the steps of:

storing a plurality of reference wavelengths (λC1- λCm) in a memory as preliminary specified by ITU-T standards;

determining maximum points of light intensity from waveform data obtained by measuring an actual wavelength-division multiplexed optical spectrum;

identifying as a channel any one of the maximum points which at least differs in light intensity from two minimum points, one being right to said maximum point and the other being left, by at least a channel identifying threshold (TH) level;

determining a wavelength of the identified channel as λDn; and rounding the λDn for each channel to the value of a nearest ITU-T grid wavelength λCm so as to determine a reference wavelength λAn for each channel, which is then stored in the memory, thereby determining the reference wavelengths λAn automatically from the actual wavelength-division multiplexed signal light.

3. A method for analyzing wavelength-division multiplexed signal light, comprising the steps of:

as a first storage step, storing reference wavelengths (λCm) in a memory as specified by ITU-T standards;

as a second storage step, measuring an optical spectrum of the wavelength-division multiplexed signal light to be analyzed and storing the measured waveform data in the memory;

determining the wavelength (λDn) at the maximum point of each channel from the waveform data;

as a third storage step, rounding the wavelength (λDn) at said maximum point to the value of a nearest reference wavelength (λCm) and storing the rounded value in the memory as a reference wavelength (λAn);

as a central wavelength analyzing step, determining the central wavelength (λBn) of each channel from the waveform data and said reference wavelength (λAn);

determining a wavelength error (Δλn) which is the difference between said central wavelength (λBn) and said reference wavelength (λAn); and as an output step, outputting said central wavelength (λBn) and the wavelength error (Δλ) as the results of analysis.

4. The method according to claim 3, further comprising: identifying as a channel any one of the maximum points which at least differs in light intensity from the two minimum points, one being right to said maximum point and the other being left, by at least a channel identifying threshold (TH) level and determining the wavelength ($\lambda$Dn) of that maximum point, between said determining the wavelength ($\lambda$Dn) step and said third storage step.

5. The method according to claim 3 further comprising calculating a wavelength of each channel on the basis of input data for an optical spectrum waveform to determine the reference wavelength ($\lambda$An).

6. The method according to claim 3 or 4, further comprising: as a reference wavelength resetting step, determining if it is necessary to reset the values of the reference wavelengths ($\lambda$An) and allowing the sequence of steps to proceed to said central wavelength analyzing step if no resetting of the reference wavelengths ($\lambda$An) is made in said reference wavelength resetting step, between said second storage step and said wavelength ($\lambda$Dn) determining step.

7. The method according to claim 3 or 4, wherein if it has been decided in a reference wavelength resetting step to reset the values of the reference wavelengths ($\lambda$An), the sequence of steps proceeds to the step of determining the wavelength ($\lambda$Dn) at the maximum point of each channel from the waveform data obtained in claim 3.

8. The method according to claim 3 or 4, wherein said output step for outputting the central wavelength ($\lambda$Bn) and the wavelength error ($\Delta\lambda$) as the results of analysis in claim 3 is followed by determining as to whether a repeated measurement is to be made and if the answer is yes, the sequence of steps returns to the second storage step for measuring the optical spectrum of the wavelength-division multiplexed signal light to be analyzed and storing the measured waveform data in the memory.

9. An apparatus for analyzing wavelength-division multiplexed signal light, comprising:
a first storage section for storing reference wavelengths ($\lambda$Cm) in a memory as preliminary specified by ITU-T standards;
a first analysis section for analyzing the wavelength ($\lambda$Dn) of each channel from input data for optical spectrum waveform;
a third analysis section for rounding the analyzed wavelength ($\lambda$Dn) of each channel to a value of a nearest reference wavelength ($\lambda$Cm) to be used as the reference wavelength ($\lambda$An) of each channel;
a second storage section for storing the analyzed reference wavelength ($\lambda$An) of each channel; and
a second analysis section for analyzing the central wavelength ($\lambda$Bn) of each channel from the input data for optical spectrum waveform and the reference wavelength ($\lambda$An) of each channel.

10. An apparatus for analyzing wavelength-division multiplexed signal light, comprising:
a storage section to store a plurality of reference wavelengths ($\lambda$C1- $\lambda$Cm) in a memory as preliminary specified by ITU-T standards;
an analysis section to determine maximum points of light intensity from waveform data obtained by measuring an actual wavelength-division multiplexed optical spectrum;
an analysis section to identify as a channel any one of the maximum points which at least differs in light intensity from two minimum points, one being right to said maximum point and the other being left, by at least a channel identifying threshold (TN) level;
an analysis section to determine a wavelength of the identified channel as $\lambda$Dn; and
an analysis section to round the $\lambda$Dn for each channel to a value of a nearest ITU-T grid wavelength $\lambda$Cm so as to determine a reference wavelength $\lambda$An for each channel, which is then stored in the memory, thereby determining the reference wavelengths $\lambda$An automatically from the actual wavelength-division multiplexed signal light.

11. An apparatus for analyzing wavelength-division multiplexed signal light, comprising:
a storage section to store reference wavelengths ($\lambda$Cm) in a memory as specified by ITU-T standards;
a measuring section to measure an optical spectrum of the wavelength-division multiplexed signal light to be analyzed and storing the measured waveform data in the memory;
an analysis section to determine the wavelength ($\lambda$Dn) at the maximum point of each channel from the waveform data;
an analysis section to round the wavelength ($\lambda$Dn) at said maximum point to the value of
a nearest reference wavelength ($\lambda$Cm) and store the rounded value in memory as a reference wavelength ($\lambda$An);
an analysis section to determine the central wavelength ($\lambda$Bn) of each channel from the waveform data and said reference wavelength ($\lambda$An);
an analysis section to determine a wavelength error ($\Delta\lambda$n) which is the difference between said central wavelength ($\lambda$Bn) and said reference wavelength ($\lambda$An); and
an output section to provide said central wavelength ($\lambda$Bn) and the wavelength error ($\Delta\lambda$) as the results of analysis.

12. The apparatus according to claim 11 further comprising: an analysis section to identify as a channel any one of the maximum points which at least differs in light intensity from the two minimum points, one being right to said maximum point and the other being left, by at least a channel identifying threshold (TH) level and to determine the wavelength ($\lambda$Dn) of that maximum point.

13. The apparatus according to claim 11 further comprising:
an analysis section to analyze a wavelength of each channel on the basis of input data for an optical spectrum waveform; and
a storage section to store the analyzed wavelength of each channel as the reference wavelength of the channel.

14. The apparatus according to claim 11 or 12 further comprising:
an analysis section to determine if it is necessary to reset the values of the reference wavelengths ($\lambda$An) and to allow the apparatus to proceed to determine the wavelength of each channel if no resetting of the reference wavelengths ($\lambda$An) is made.

15. The apparatus according to claim 11 or 12 wherein, if it has been decided to reset the values of the reference wavelengths ($\lambda$An), an analysis section proceeds to determine the wavelength ($\lambda$Dn) at the maximum point of each channel from the obtained waveform data.

16. The apparatus according to claim 11 or 12 including an analysis section to determine whether a repeated measurement is to be made and if the answer is yes, to re-measure the optical spectrum of the wavelength-division multiplexed signal light to be analyzed and to store the measured waveform data in the memory.

* * * * *